Figure 1:
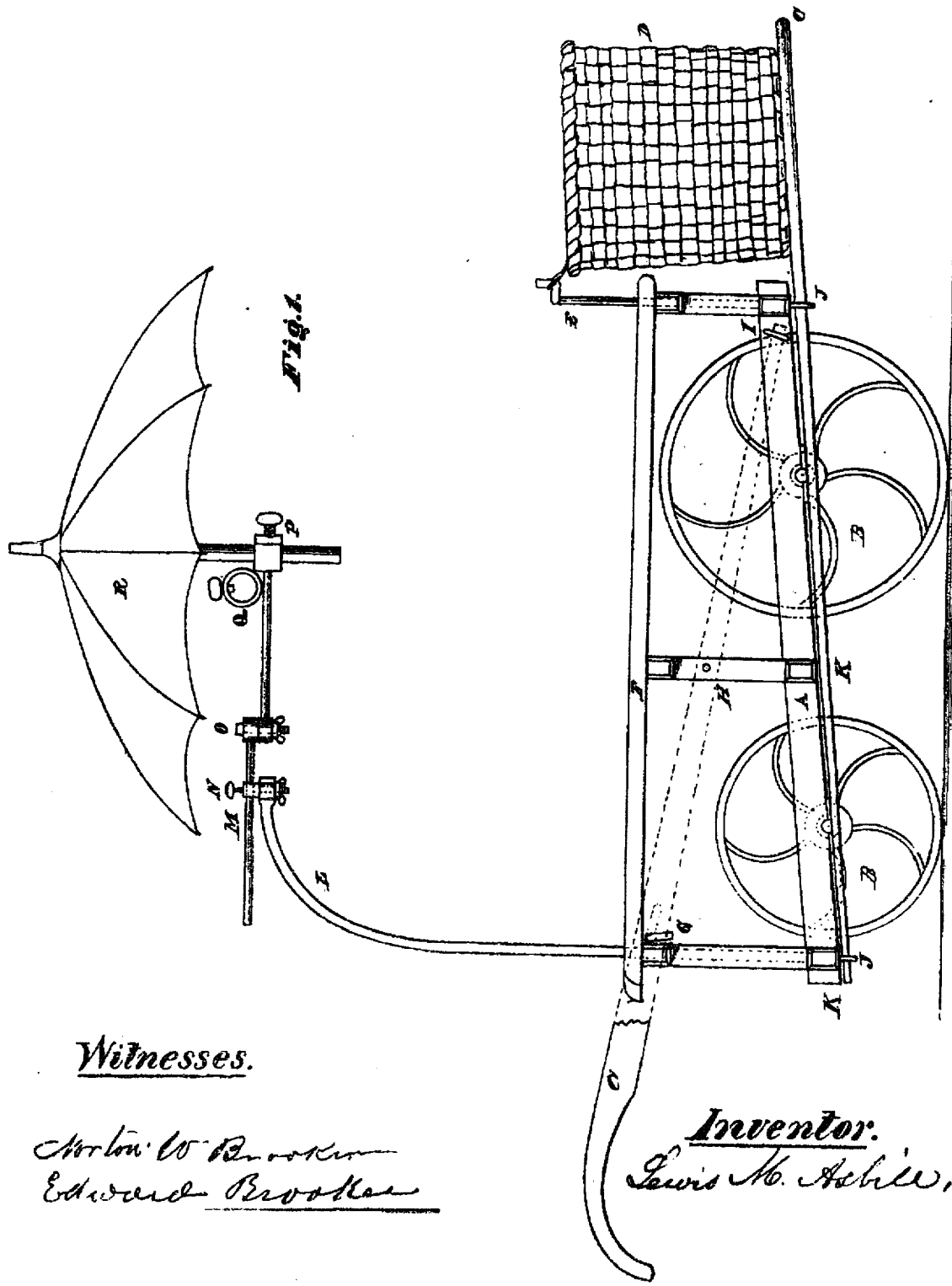

LEWIS M. ASBILE.
Improvement in Cotton Pickers' Velocipede.

No. 120,478.  Patented Oct. 31, 1871.

2 Sheets--Sheet 1.

Witnesses.
Norton W. Brooker
Edward Brooker

Inventor.
Lewis M. Asbile.

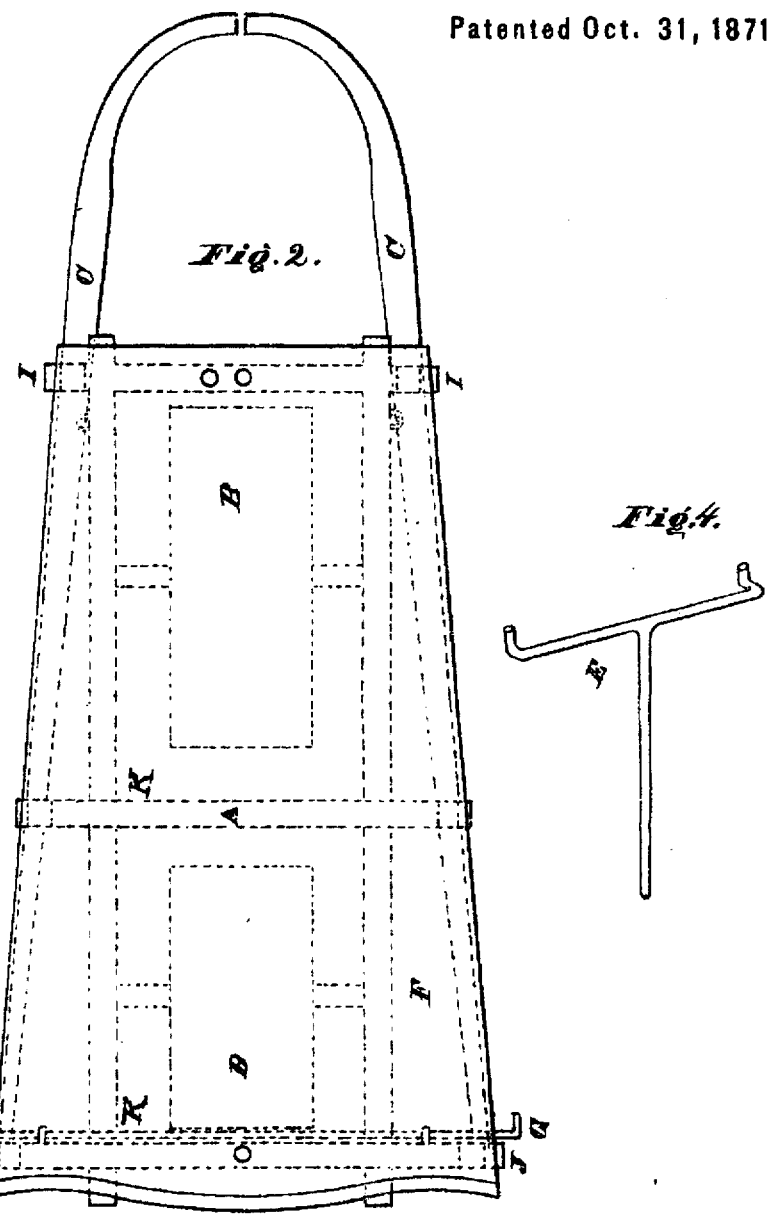

UNITED STATES PATENT OFFICE.

LEWIS MONROE ASBILL, OF EDGEFIELD COUNTY, SOUTH CAROLINA.

IMPROVEMENT IN COTTON-PICKERS' VELOCIPEDES.

Specification forming part of Letters Patent No. 120,478, dated October 31, 1871.

*To all whom it may concern:*

Be it known that I, LEWIS MONROE ASBILL, of Edgefield county and State of South Carolina have invented an Improved Cotton-Picker's Velocipede, of which the following is a specification:

The object of my invention is to make cotton-picking—a work which is tedious and laborious—a pleasant recreation, thus enabling the picker to gather nearly double the cotton with than without the machine, and with great ease and comfort to himself.

Figure 1 is a side view of the machine embodying my invention. Fig. 2 is a plan of the same, except umbrella. Fig. 3 is a rear view of the machine. Fig. 4 is the basket-holder.

A is the frame of the machine, which frame should be substantially constructed of durable wood. B B are the wheels. The front and larger one is fourteen inches diameter and six inches tire, to prevent sinking in the ground when at work. The rear or lesser wheel is eleven inches in diameter and six inches tire. They are of cast-iron, the thickness of tire about one-eighth of an inch, so as to have no surplus weight about it and yet give sufficient strength. C C are the handles. The one dotted through shows the position when not at work. The other, through the staples, and on which the basket D sits, shows the position when at work. D is the small basket. E is the basket-holder. F is the seat-board, on which the picker sits when picking. G G are the ends of the rod, passing through the slot in the handles to secure them to the machine. H H are the pins, passing through the handles to prevent them drawing out of staples I I at the front and lower part of the frame. J are four staples, two in front and two in rear, at the corners and under the frame, to receive the handles when the machine is prepared for work. K K are two scrapers, secured to the rear and middle cross-pieces of the frame underneath, and whose edges just clear the tire of each wheel, the intention of which is to keep the wheels clean when used in clay lands. L is the umbrella-staff in its proper position, as shown in Figs. 1 and 3, passing through the seat-board, rear top cross-piece of the frame, and nearly through the bottom cross-piece. M is a sliding joint, to extend the arm of the staff by means of the thumb-screw N. O is a hinge-joint, by which the umbrella is made to form any arc, or an entire revolution, and also any desirable angle when the umbrella-staff is fixed in the socket Q; and P is the socket when the umbrella is upright; and R is the umbrella.

To use the velocipede, the picker sits astride the machine, the larger wheel in front, and propels it forward or backward, as he may desire, by a slight motion of the body forward, at the same time making slight pressure with the feet in the opposite direction. It guides itself. It is propelled with great ease as fast as necessary, even on level land, and on hilly lands it propels itself. All the picker has to do is to roll the machine to the top of the hill and pick going down grade. The velocipede enables the picker to gather nearly double the number of pounds per day than he could without it, because he is never tired, both hands perfectly free all the while, no stooping, no heavy sack hanging to his neck, no carrying large baskets of cotton on head or shoulder; for when the machine is at work it is as represented in Fig. 1; and when the picker wishes to take his day's work home he draws the handles from the slots or staples beneath the frame and attaches them as represented by dotted lines in Fig. 1, and then sets his large basket of cotton on the seat-board, and the basket-holder is used to hold on this basket also. The picker now takes hold of the handles, raises the hind or small wheel clear of the ground, thus converting the machine into a wheelbarrow. He (or she) wheels the cotton home with great ease.

The umbrella may be used or not, at the option of the pickers, though all persons of feeble constitution, the aged and infirm, the maimed, and those convalescent from any fevers or other disease, are advised to use it to shield them from heat, rain, and cold winds when the picking continues late.

Ladies may use the velocipede with the same facility as men, the only difference is they sit with both feet in rear of the machine and propel it backward. They should use a cushion to sit on.

I claim as my invention—

1. The cotton-pickers' velocipede, as described.
2. The basket-holder E or equivalent.
3. The propelling-handles C, convertible into the basket-support.
4. In combination with the above, the umbrella-holder.

LEWIS M. ASBILL.

Witnesses:
NORTON W. BROOKER,
EDWARD BROOKER.

(31)